US 6,722,604 B2

(12) United States Patent
Takano et al.

(10) Patent No.: US 6,722,604 B2
(45) Date of Patent: Apr. 20, 2004

(54) ARMATURE, METHOD AND APPARATUS THEREOF

(75) Inventors: Tadashi Takano, Shuuchi-gun (JP); Susumu Ando, Shuuchi-gun (JP); Yoshio Kato, Komaki (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/064,546

(22) Filed: Jul. 25, 2002

(65) Prior Publication Data

US 2003/0025025 A1 Feb. 6, 2003

(30) Foreign Application Priority Data

Aug. 3, 2000 (JP) ........................................ 2001-235693

(51) Int. Cl.$^7$ ............................................. H02K 15/085
(52) U.S. Cl. ........................................ 242/432.2; 29/605
(58) Field of Search ............................. 242/432, 432.1, 242/432.2, 432.3, 432.4, 447.2; 29/605

(56) References Cited

U.S. PATENT DOCUMENTS

| 2,542,515 A | * | 2/1951 | Harvey ........................ 74/122 |
| 2,551,135 A | * | 5/1951 | Justice ........................ 242/432 |
| 3,995,785 A | * | 12/1976 | Arick et al. ............. 242/432.4 |
| 4,847,982 A | * | 7/1989 | Morrill ........................ 29/596 |

* cited by examiner

Primary Examiner—Emmanuel Marcelo
(74) Attorney, Agent, or Firm—Ernest A. Beutler (57) ABSTRACT

An automatic machine and method of winding of armatures having maximum coil density because the winding nozzle does not enter into the slots between the pole teeth and the wire is directed toward the core portion of the armature during winding to improve coil density.

6 Claims, 7 Drawing Sheets

ARMATURE, METHOD AND APPARATUS THEREOF

BACKGROUND OF INVENTION

This invention relates to a method of winding armatures for revolving-field electrical machines and more particularly to an improved winding method and apparatus that permits a greater coil density to be obtained and avoids the likelihood of damaging the wire by the winding needle during the winding operation.

Various methods have been employed for forming the coil windings for the armature of rotating electrical machines such as motors or generators. Generally these winding methods result in somewhat complicated structures and structures wherein the maximum coil densities are not capable of being obtained. Several of these methods involved passing a needle in the slot between the extending cores of the armature and then having that needle circumscribe the individual cores so as to form the windings. Because of the fact that the needle must be passed in the space between the cores, room must be left for it and this decreases the coil density.

In addition, there is a likelihood that the needle may engage already wound coils and damage them particularly by removing their insulation. These various prior art methods are described in full detail in the co-pending application assigned to the Assignee hereof, entitled "Stator Coil Structure For Revolving-Field Electrical Machine and Method Of Manufacturing Same", application Ser. No. 09/683764, filed Feb. 12, 2002.

Disclosed in that co-pending application are several ways in which the coil can be wound without necessitating the passage of the winding needle through the slots between adjacent pole teeth. This involves looping the wire around the pole teeth in a lasso type fashion and effecting movement of each winding along the pole tooth toward the circular core of the armature. In order to assist in this pulling action, devices have been provided on the insulating bobbins around which the wire is looped or the end of the wire is held in some fashion at this end of the pole tooth. If the insulator is provided with these projections, then it is necessary to cause movement of the needle to this end of the pole tooth at the side thereof in order to provide the attachment or looping. This somewhat complicates the mechanism and also adds parts unnecessarily to the bobbin.

It is, therefore, a principal object to this invention to provide an improvement in this type of winding arrangement wherein a separate system is provided for directing the wire ends to at least one the ends of the core portion of the armature to facilitate winding.

It is a further object to this invention to provide an improved apparatus for performing this function.

SUMMARY OF INVENTION

A first feature of the invention is adapted to be embodied in a method of winding the coils of a rotating electrical machine. In this method, a circular core of magnetic material with a plurality of magnetic pole teeth extending radially from the circular core is provided. Each of the magnetic pole teeth defines a core and slots formed there between. Each of the slots defines a mouth that is formed between adjacent outer ends of the cores. The winding method comprises the steps of positioning a threading needle having an opening through which the wire for the winding of the coils is fed into proximity to one of the mouths. The needle opening is moved in a path around one of the pole teeth and at one side of the slot without moving the needle in any substantial distance along the length of the one pole tooth to form a first winding. A portion of at least the initial winding is directed toward the pole tooth. The movement of the needle opening is continued in a path around the one of the pole teeth at the one side of the slot without moving the needle in any substantial distance along the length of the one pole tooth to form succeeding windings. This operation forces the previous winding along the pole tooth toward the circular core without requiring movement of the needle in any substantial distance along the length of the one pole tooth so that the needle not be moved any substantial distance into the slot.

A further feature of the invention is adapted to be embodied in an apparatus for performing the aforenoted method of winding the coils of a rotating electrical machine. In this apparatus a threading needle having an opening through which the wire for the winding of the coils is fed is provided. A drive is provided for moving the needle opening in a path around one of the pole teeth and at one side of the slot without moving the needle in any substantial distance along the length of the one pole tooth to form a first winding. A directing mechanism directs at least a portion the winding toward the pole tooth so that when movement of the needle opening is continued in a path around the one of the pole teeth at the one side of the slot without moving the needle in any substantial distance along the length of the one pole tooth to form succeeding windings the pulling action of restrained winding portion forces the previous winding along the pole tooth toward the circular core without requiring movement of the needle in any substantial distance along the length of the one pole tooth so that the needle not be moved any substantial distance into the slot.

BRIEF DESCRIPTION OF DRAWINGS

FIGS. 12a–12k are a series of cross sectional views taken at equal intervals along the length of FIG. 8 starting at the base of the pole tooth (left hand side) and ending at the tip (right hand side) thereof.

DETAILED DESCRIPTION

Figure 1:
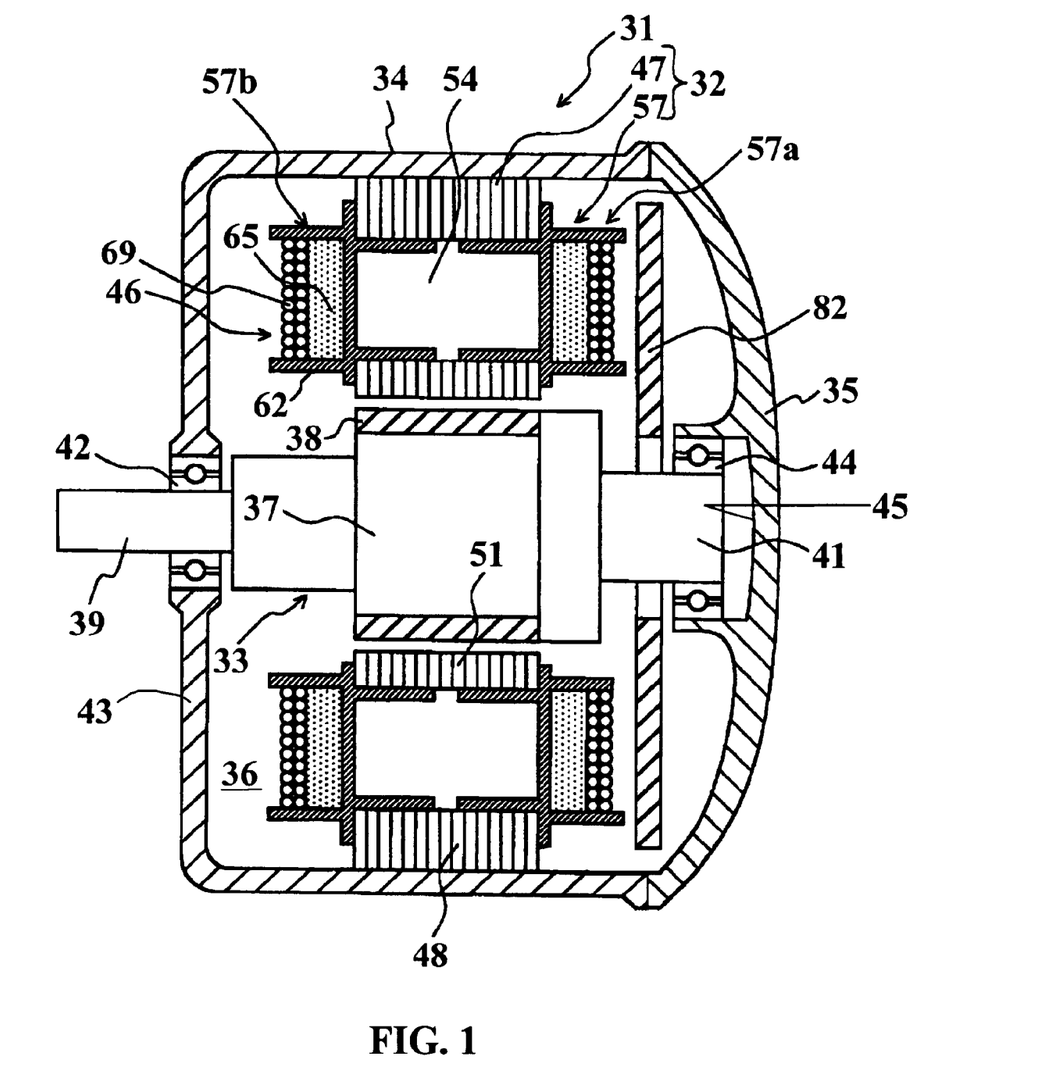
FIG. 1 is a cross sectional view taken through a rotating electrical machine formed by a method and apparatus in accordance with one embodiment of the invention.

Referring now in detail to the drawings and initially with primary reference first to FIG. 1, a rotating electric machine constructed in accordance with the invention is identified generally by the reference 31. The rotating electric machine 31 may be either an electric motor or a generator depending upon the desired application.

The rotating electrical machine 31 is comprised of a stator assembly, indicated generally by the reference numeral 32, and a rotor assembly, indicated generally by the reference numeral 33. These components are contained within a housing assembly that is comprised of a cup shaped, main housing piece 34 and a cover plate 35, which is suitably attached thereto to form an enclosure 36 in which the stator assembly 32 and rotor assembly 33 are positioned.

The rotor assembly 33 is formed with a central portion 37 on which a plurality of circumferentially spaced permanent magnets 38 having alternating polarity are affixed in a known manner. The end portions of the rotor assembly 33 comprise shaft portions 39 and 41 that are journalled, respectively, in bearings 42 carried by an integral closure wall 43 of the cup shaped, main housing piece 34 and bearings 44 carried in a recessed portion 45 of the cover plate 35.

The construction of the rotor assembly 33 may be deemed to be of the general conventional type and any type known in this art might be employed. Also, although the described machine employs an arrangement wherein a coil winding assembly, indicated generally by the reference numeral 46 is provided on individual armature poles, to be described, formed on the stator assembly 32, it should be understood that the coil winding assembly 46 can be mounted on the rotor assembly 33 and the permanent magnets 38 may be mounted as part of the stator assembly including the cup shaped, main housing piece 34.

Figure 2:
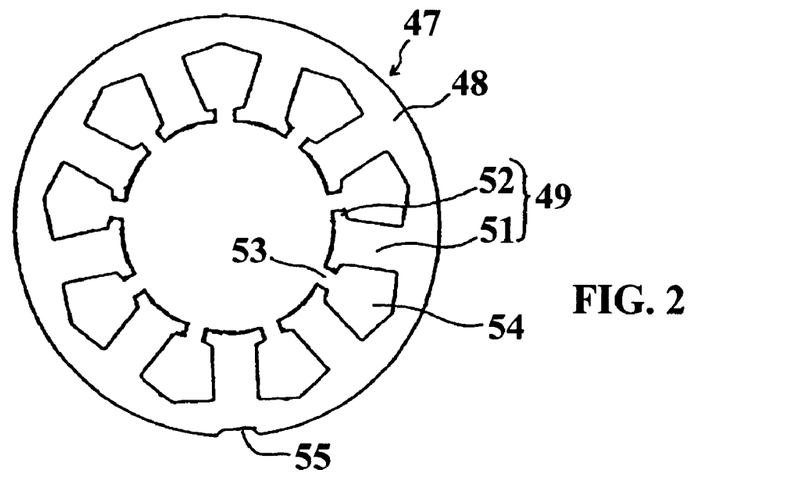
FIG. 2 is an end elevational view of the laminations of the magnetic core looking from one side but not showing the skewing of the pole teeth.
Figure 3:
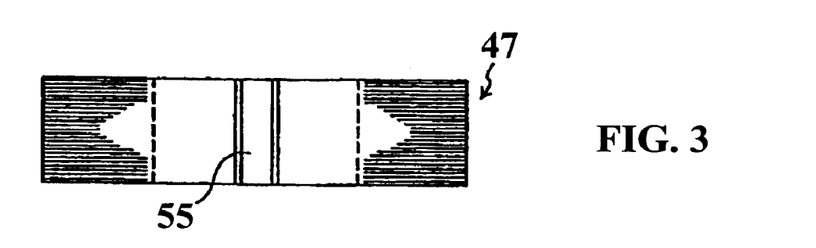
FIG. 3 is a side elevational view of the core.
Figure 4:
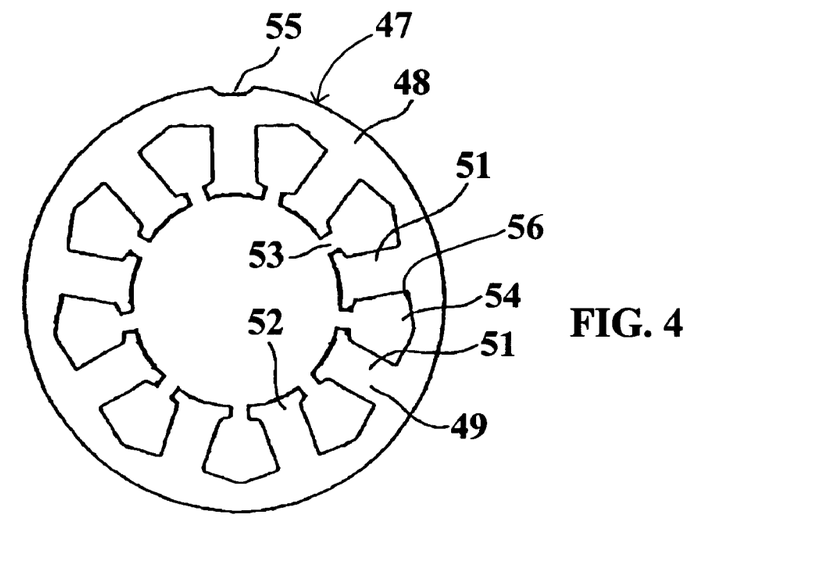
FIG. 4 is end elevational view of the core looking in the opposite direction from FIG. 2 but again not showing the skewing of the pole teeth.

The stator assembly 32 is comprised of an armature core, indicated generally by the reference numeral 47, which is made up of a plurality of laminated armature plates as shown in FIGS. 2 through 4. In this embodiment, since the armature core 47 is the outer element of the rotating electric machine 31, it is comprised of a circular portion 48 from which a plurality of pole teeth, each indicated generally by the reference numeral 49, extend. The pole teeth 49 have generally rectangular portions 51 that extend outwardly from the circular portion 48 and which terminate in enlarged, projecting ends 52. Gaps 53 are formed between adjacent ends of these projecting ends 52, which form the outer termination of slots 54, formed between adjacent pole teeth 49.

In order to assist in the alignment of the lamination of the core pieces of the armature core 47, each of them is formed with a reference slot 55 on the outer periphery of their circular portion 48. This slot 55 assists in alignment as well as location within the cup shaped, main housing piece 34.

The ends of the slots 54 adjacent the circular portion 48 of the armature core 47 is defined by angularly disposed surfaces 56 formed on opposite sides of the bases of each of the pole teeth 49. These act as projections that cooperate with the projecting ends 52 at the outer ends of the teeth 49 so as to assist in locating an insulating bobbin forming members 57 around which the coil winding assembly 46 is formed as well as locating the individual windings themselves.

The insulating bobbin forming members 57 are comprised of right and left hand sections 57a and 57b, which have a substantially identical construction, except as will be hereinafter described.

Like the armature core 47, the insulating bobbin forming member 57 is comprised of a circular portion 58 that has an L-shaped cross section and from which extend individual legs 59 of a generally U-shape which is complimentary to and snuggly received on the core pole teeth 49. Inclined surfaces 60 at the base of these legs 59 cooperate with the aforenoted angularly disposed surfaces 56 formed at the outer ends of the pole teeth 49 so as to provide a stop or abutment against which the coil windings actually engage. This construction also facilitates alignment.

Figure 5:
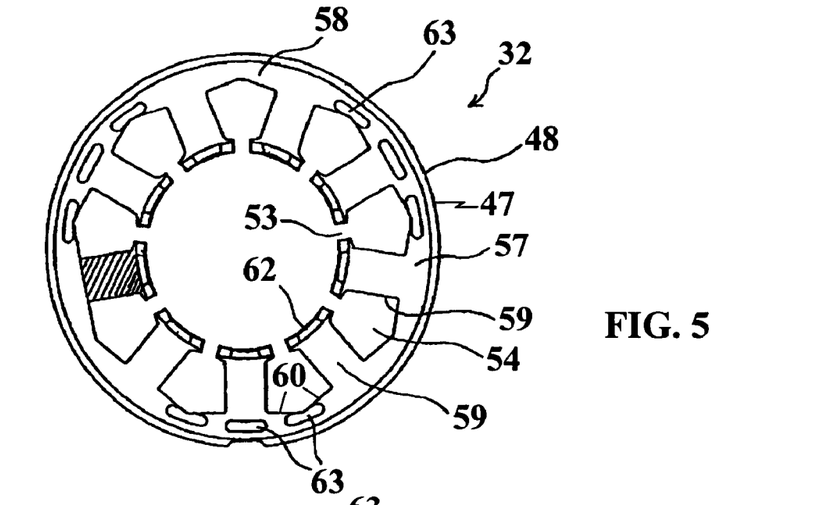
FIG. 5 is an end elevational view, in part similar to FIG. 2, but shows the construction with the insulator in place with one portion of the insulator shaded to show how the side of the insulator is configured to assist in the winding operation but again not showing the skewing of the pole teeth.
Figure 6:
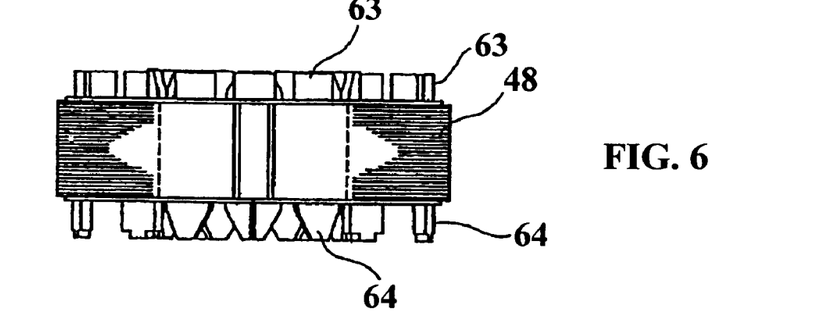
FIG. 6 is a side elevational view, in part similar to FIG. 3, but shows the core assembly with the insulator in place.
Figure 7:
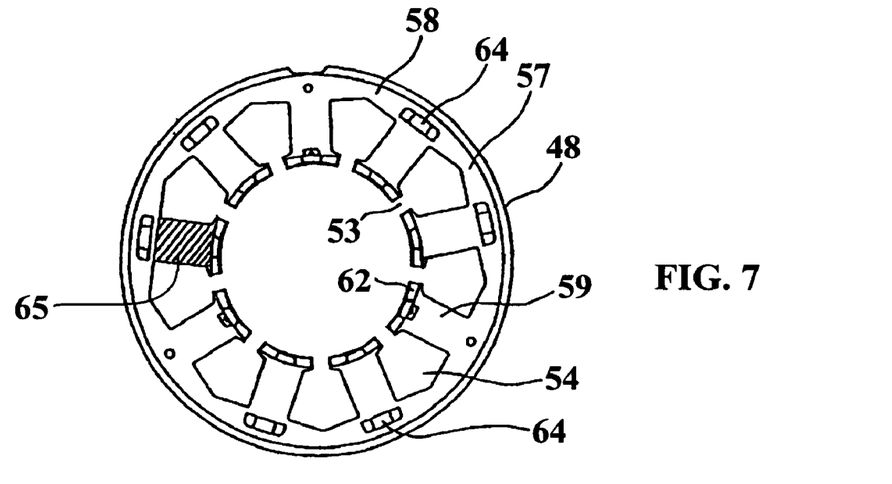
FIG. 7 is an end elevational view, in part similar to FIG. 4 looking in the opposite direction from FIG. 5 and showing one portion of the insulator shaded to show how the side of the insulator is tapered but again not showing the skewing of the pole teeth.

As may be seen in FIGS. 5 through 7, the outer periphery of the circular portion 58 of the insulating bobbin forming member 57 extends to a lesser circumferential extent than the outer periphery of the circular portion 48 of the armature core 47.

At the outer periphery of the insulator legs 59 and in the area between the slot gaps 53, the insulating bobbin forming member 57 have axially extending flange portions 61. These flange portions 61 are substantially co-extensive with the projecting ends 52 of the armature core portions 51. In addition, an arcuate portion 62 interconnects these axially extending flange portions 61 and extends axially outwardly so as to provide an abutment against which the coil winding assembly 46 will be confined as hereinafter noted.

Further projections, indicated at 63, are formed at circumferentially spaced locations around the periphery of the insulating bobbin forming member 57, at least one of which is aligned with the insulator leg portion 59 and another of which is positioned adjacent the intersection between the inclined surfaces 60 as best shown in FIG. 5. This construction is formed at one side of the insulator on one of the insulating bobbin forming member 57a or 57b. The spacing of these projections is chosen in order to facilitate the passage of wires connecting the individual coils of the coil winding assembly 46. On the other side, there are similar further projections, indicated at 64, which may form a similar purpose.

Figure 8:
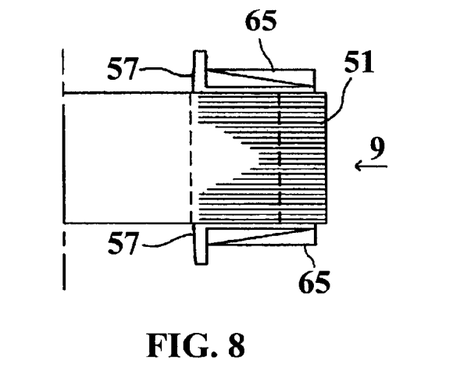
FIG. 8 is a cross sectional view of one of the poll teeth of this embodiment with the coil winding removed.
Figure 9:
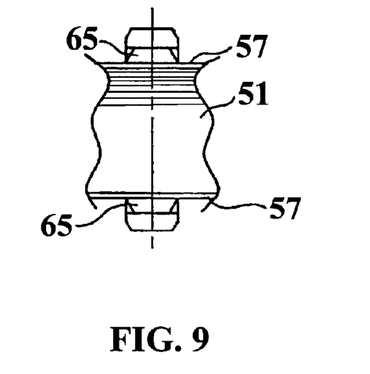
FIG. 9 is a partial end elevational view taken in the direction of the arrow 9 in FIG. 8 but again not showing the skewing of the pole teeth.
Figure 10:
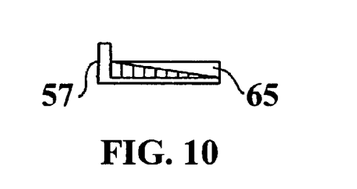
FIG. 10 is a cross sectional view of the upper bobbin half taken along the same plane as FIG. 8.
Figure 11:
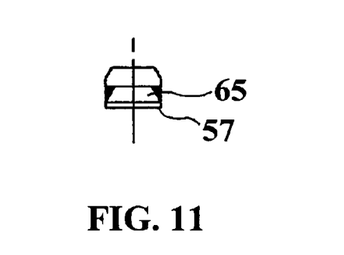
FIG. 11 is an end elevational view looking in same direction as FIG. 9.

Special insulator inserts indicated by the reference numeral 65 are placed on the faces of the insulator legs 59 on one or preferably both of the insulators in the area between the respective arcuate portions 62 and further projections 63 and 64 thereon. These insulators are shown in lines in FIGS. 6 and 8 so as to indicate their relationship to the respective insulating bobbin forming member 57*a* or 57*b*.

The shape of these insulator inserts 65 is chosen so that they act as circumference changing devices for a purpose that will be described now by reference to FIGS. 8–12. A circumference changing member 65 according to the invention is used in place of the before-mentioned taper members 65. The circumference changing member 65 may be a separate member from the insulating bobbin forming members 57 or a member molded integrally therewith.

Figure 12:
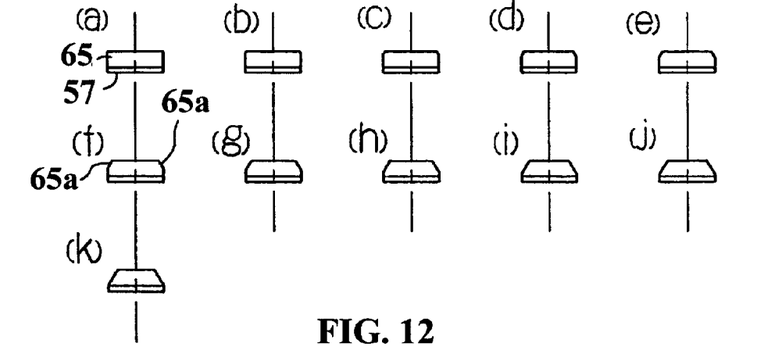
Figure 13:
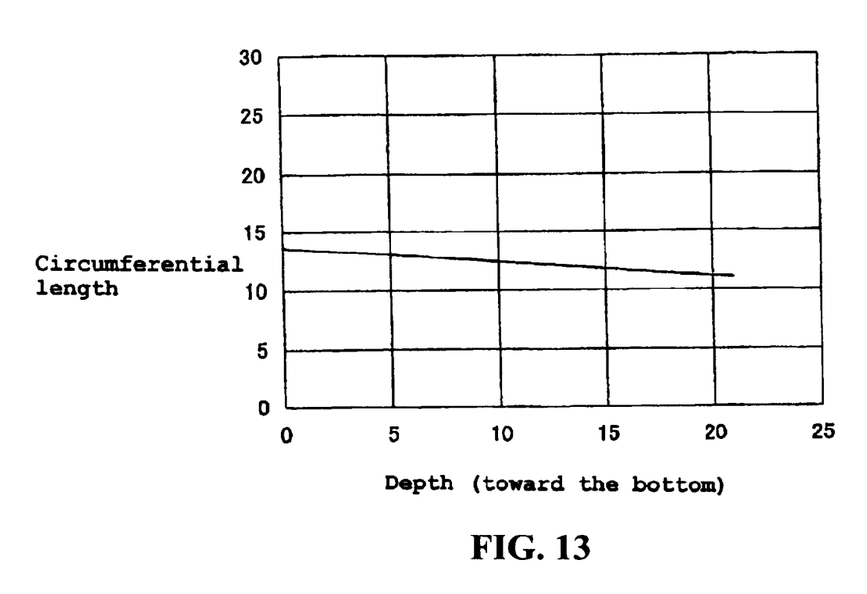
FIG. 13 is a graphical view showing how the configuration of the circumference changing member affects the winding circumference.

As shown best in FIG. 12, the circumference changing member 65 is chamfered as indicated at 65*a* at its opposite ends on the upper surface wherein the amount of this chamfering is gradually increasing from the positions of (a) through (k) toward the outer periphery. This gradually shortens the surface length of the circumference changing member 65 and accordingly the length or circumference around which each turn of the coil winding 46 makes progressing toward the tips of the pole teeth 51.

Gradually shortening the circumference in such manner allows a drawing support point of the winding that is drawn out of the needle to be disposed on the outer periphery side and allows the winding to easily slide outward when the winding is wound around the inner periphery side. Therefore, the needle winding action outside of the slot 54 (out of the inner periphery side in this example) or adjacent the inlet of the slot 54 without inserting the needle into the slot 54 allows the winding to be wound on the magnetic pole tooth 51 to the bottom side of the slot 54. In this case, as to the needle winding action, it is desirable to increase trail displacement of the loop to the extent of providing slack in the winding in order to carry out the winding action.

Thus, the drawing support point of the winding drawn out of the needle is located at the bottom of the slot to provide slack in the winding for the needle's winding action, which enables the winding to smoothly slide down to form the coil 46 on the magnetic pole tooth 51 while keeping the height of the circumference changing member 65 constant.

However the upper surface of the circumference changing member 65 may be inclined downwardly toward the bottom side as with the before-mentioned taper members 65. Forming such an inclined surface also enables the winding to slide down to the bottom side as described before. However, forming such an inclined surface makes the height of the circumference changing member on the inlet side of the slot greater, resulting in a large protrusion of the coil ends, and therefore, a greater profile thereof in the radial direction, as aforenoted. With respect to this, keeping the height constant as in the example shown in FIGS. 8–12 enables to obtain a stator with a compact profile.

It should be noted that the further projections 63 and 64 need not be formed at the base of each of the pole teeth 49 because of the inclined surfaces 60 formed thereat which will tend to preclude the wire from slipping down along the incline below that point.

The method by which the winding is accomplished may be best understood and will now be described initially by reference primarily to FIGS. 15 through 18. The winding apparatus includes a needle carrier 71 that carries a winding needle 72 having a suitable configuration. The needle carrier 71 and needle 72 are formed with wire guide opening 73 through which the individual enameled wire strand 69 passes from a feed roll 74. The path of wire travel is indicated by the arrows R in FIG. 16.

Figure 16:
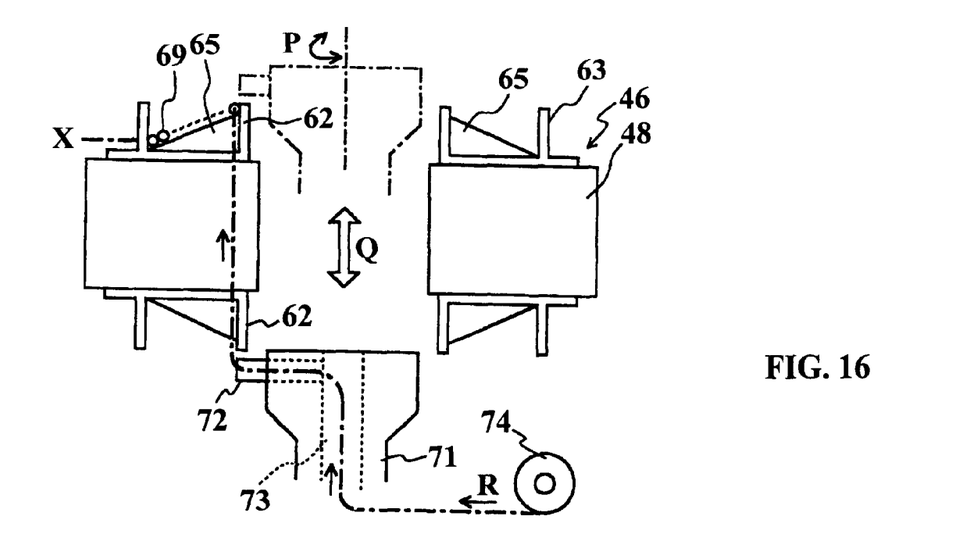
FIG. 16 is partial top plan view showing the actual configuration of the winding apparatus and the way that the motion shown in FIG. 15 is achieved.

Initially, one end of the wire is clamped at the position shown at X in FIG. 16, this being disposed radially outwardly beyond the end of the armature core 47 to form one end of one of the coil windings of the coil winding assembly 46. In this way, when the windings are formed, the bulging portion that overlies the wire end will not fill the slots 54 but will be positioned in an axial direction outwardly from these gaps and along one side face of the individual pole teeth 49.

Figure 14:
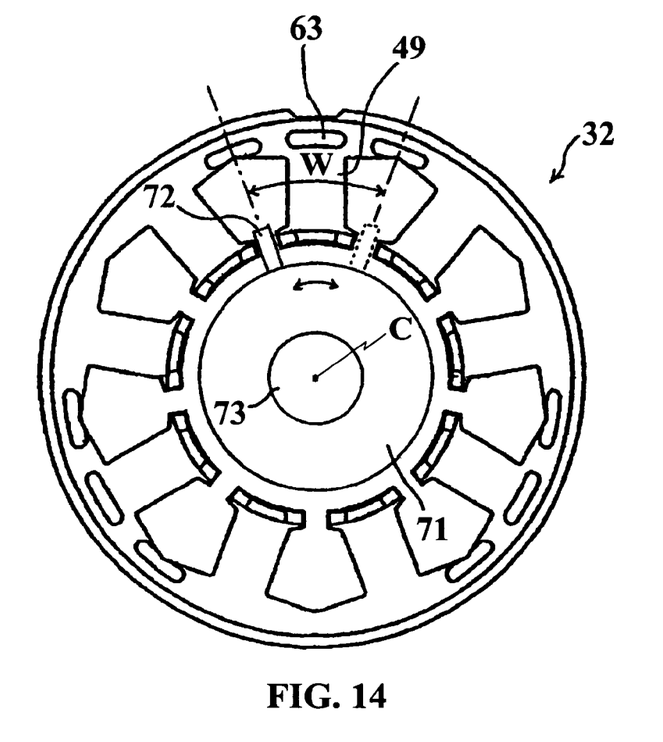
FIG. 14 is a view, in part similar to FIG. 5, and shows how the winding needle is associated with the slots between the pole teeth during the winding operation.
Figure 15:
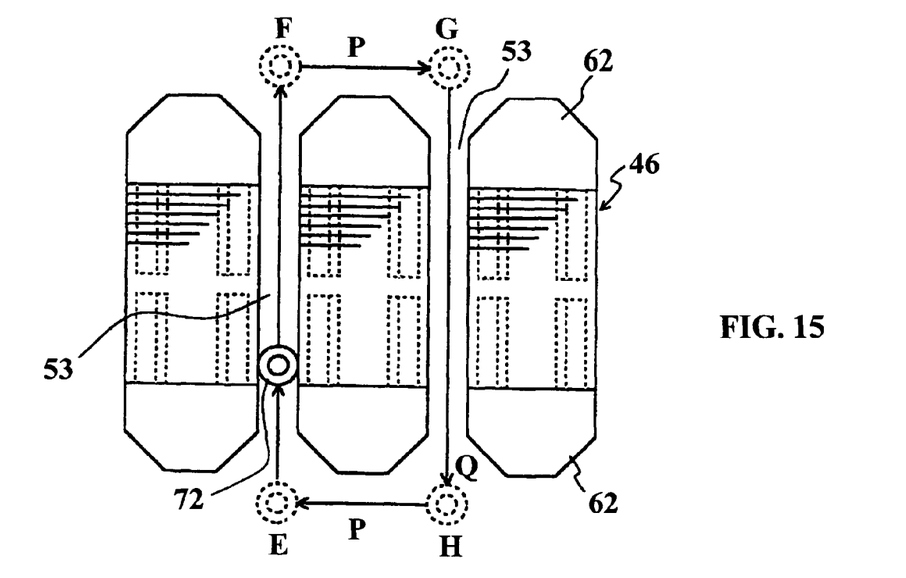
FIG. 15 is a view showing the path that the winding needle takes during the winding operation in accordance.

The needle carrier 71 generally moves in a rectangular pattern around the individual pole teeth 49 and their overlying insulating bobbin forming members 57 as seen in FIG. 15. The winding needle 72 also rotates, as shown by the arrow in FIG. 14, through an arc W as it encircles the individual pole tooth 49. The needle 72 can either be radially positioned in the area immediately inside of the slot 54 in the area formed in the gaps 53 between the projecting ends 52 at the ends of the pole teeth 49, or radially inwardly of this area as long as during the winding operation the wire will contact the inner edge of the arcuate portion 62 of the insulating bobbin forming member 57.

As the wire is wound, it will be trapped by these edges and will engage the axially outermost portion of the insulator insert 65. Thus, as the needle traverses the path shown by the arrows P in FIG. 15, the wire strands 69 will be engaged with the axial outermost portions of the insulator insert 65. After traversing this area, then the needle 72 and needle carrier 71 is moved in the area indicated by the arrows Q in the radial direction between the adjacent pole teeth 49 and specifically the area of the slots 54.

As each winding is completed, the next winding will engage the previous winding and force it down the incline of the insulator insert 65 so that the wires will collect at the radial outer periphery of the slots 54. There the wire will be restrained by the inclined surfaces 60 of the insulating bobbin forming members 57.

Then, the next series of windings is made and is provided a very neat winding without bulges and which occupies substantially one half at the gap between the pole teeth 49 in the slots 54. This provides a very dense coil and insures maximum output of the machine.

In this case, the winding is drawn out of the tip of the needle 72 to the extent of providing slack in the winding to allow the trail movement of the loop of the tip of the needle 72 to be greater than the length of the coil turn. The drawing support point X of the winding is fixedly located at a point further outside than the bottom side end of the slot 54, thus to provide slack in the winding for its winding action, so that the winding is displaced in the direction of the drawing support point X through a lassoing action while the coil is wound on the magnetic pole tooth 51.

Figure 17:
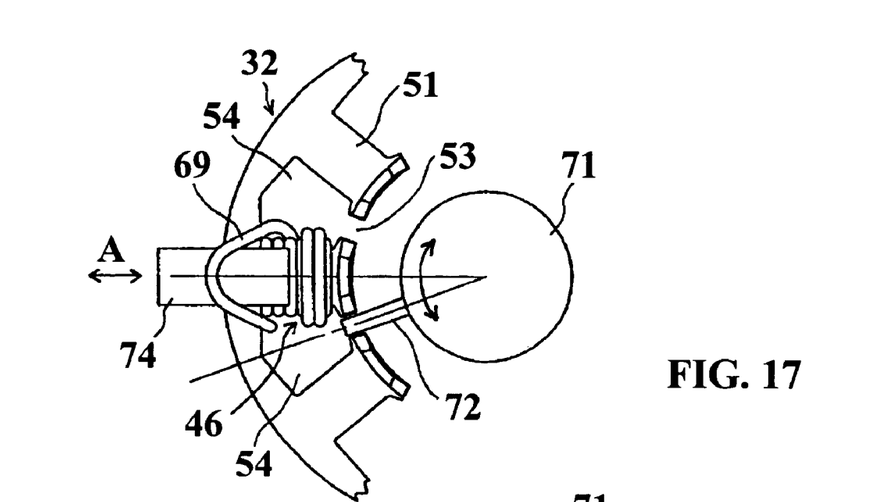
FIG. 17 is a view, in part similar to FIG. 16, but looking from above and showing how the hooking device in accordance with this embodiment functions to position the coil winding along the pole teeth of the armature.
Figure 18:
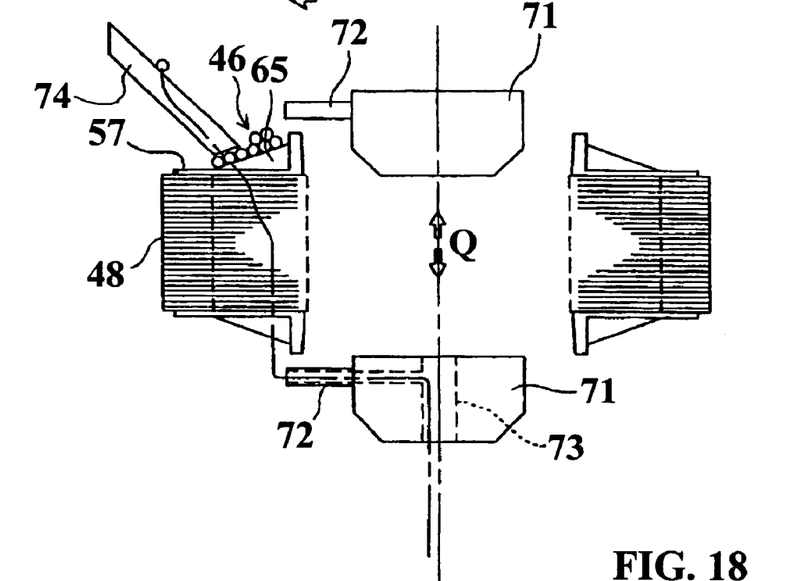
FIG. 18 is a cross sectional view, looking in the same direction as FIG. 16 but showing the positioning structure of FIG. 17.

The structure for guiding the wire 69 toward the insulator insert 65 in the area at the radial ends of the pole teeth 51 during the winding will now be described by reference to FIGS. 17 and 18. A guide member 74 is positioned radially outside of the circular core portion 48 and axially above it in this example. This guide member 74 is downwardly inclined toward the insulator insert and is reciprocal in the longitudinal direction of the magnetic pole tooth 51 as indicated by the arrows A. As the wire is deposited by the needle 72 it will impinge on the guide member 75 and be deposited on the insulator insert 65 in the case of the first layer of winding or upon the previously deposited layer as subsequent layers are wound.

After the desired of the winding methods have been performed utilizing any of the aforedescribed winding methods, a controller assembly of any desired type 82 (FIG. 1) is mounted on the further projections 64 of the insulating bobbin forming member 57A.

Thus it should be readily apparent from the foregoing description that the described embodiment provides automatic machine winding of armatures having maximum coil density because the winding nozzle does not enter into the slots between the pole teeth and direction of the wire ends toward the core portion of the armature to facilitates winding and improves winding density. Of course, the foregoing description is that of preferred embodiments of the invention and various changes and modifications may be made without departing from the spirit and scope of the invention, as defined by the appended claims.

What is claimed is:

1. A method of winding the coils of a rotating electrical machine on a circular core of magnetic material with a plurality of magnetic pole teeth extending radially from the circular core, each of the magnetic pole teeth defining a core and slots formed there between each of the slots defines a mouth that is formed between adjacent outer ends of the cores, said winding method comprising the steps of positioning a threading needle having an opening through which the wire for the winding of the coils is fed into proximity to one of the mouths, moving the needle opening in a path around one of the pole teeth and at one side of the slot without moving the needle in any substantial distance along the length of the one pole tooth to form a first winding, employing a device for directing a portion of at least the initial winding toward the pole tooth, continuing the movement of the needle opening in a path around the one of the pole teeth at the one side of the slot without moving the needle in any substantial distance along the length of the one pole tooth to form succeeding windings.

2. The method of winding the coils of a rotating electrical machine as set forth in claim 1 wherein the winding is directed by deflecting it against a guide member inclined toward the core tooth.

3. The method of winding the coils of a rotating electrical machine as set forth in claim 2 wherein the guide member is moved relative to the core tooth.

4. An apparatus for winding the coils of a rotating electrical machine on a circular core of magnetic material with a plurality of magnetic pole teeth extending radially from the circular core, each of the magnetic pole teeth defining a core and slots formed there between each of the slots defines a mouth that is formed between adjacent outer ends of the cores, apparatus comprising a threading needle having an opening through which the wire for the winding of the coils is fed into proximity to one of the mouths, a drive for moving the needle opening in a path around one of the pole teeth and at one side of the slot without moving the needle in any substantial distance along the length of the one pole tooth to form a first winding, and an abutment for directing a portion of at least the initial winding toward the pole tooth during continuing the movement of the needle opening in a path around the one of the pole teeth at the one side of the slot without moving the needle in any substantial distance along the length of the one pole tooth to form succeeding windings.

5. An apparatus for winding the coils of a rotating electrical machine as set forth in claim 4 wherein the abutment comprises a guide member.

6. An apparatus for winding the coils of a rotating electrical machine as set forth in claim 5 wherein the drive moves guide member along the pole tooth.

* * * * *